United States Patent
Shaw et al.

[11] Patent Number: 5,891,223
[45] Date of Patent: Apr. 6, 1999

[54] MULTI-STAGE VENT FILTER

[75] Inventors: Mark D. Shaw, Ponte Vedra Beach; Laurence M. Bierce; J. Tad Heyman, both of Jacksonville, all of Fla.

[73] Assignee: UltraTech International, Inc., Jacksonville, Fla.

[21] Appl. No.: 915,250

[22] Filed: Aug. 20, 1997

[51] Int. Cl.$^6$ .............. B01D 46/00; B01D 53/04
[52] U.S. Cl. .............. 96/134; 55/385.4; 55/482; 55/504; 55/505
[58] Field of Search .............. 96/134, 135, 138; 55/385.4, 385.6, 385.1, 504, 505, 482, 486, 487

[56] References Cited

U.S. PATENT DOCUMENTS

| | | | |
|---|---|---|---|
| 2,603,308 | 7/1952 | McCall | 96/138 |
| 2,784,801 | 3/1957 | Lunde | 55/482 |
| 2,944,548 | 7/1960 | Katzin | 55/482 |
| 2,945,430 | 7/1960 | Slick | 55/505 |
| 3,033,911 | 5/1962 | Duddy | 55/505 |
| 4,026,688 | 5/1977 | Patterson | 55/486 |
| 4,146,277 | 3/1979 | Santoro | 96/134 |
| 4,853,013 | 8/1989 | Rio et al. | 55/385.4 |
| 4,957,518 | 9/1990 | Brassell | 55/385.4 |
| 4,957,522 | 9/1990 | Brassell | 55/385.4 |
| 5,193,709 | 3/1993 | Brassell | 55/510 |
| 5,316,569 | 5/1994 | Heunermund | 96/138 |
| 5,348,570 | 9/1994 | Ruppert, Jr. et al. | 55/504 |
| 5,725,645 | 3/1998 | Wickland et al. | 55/385.4 |

*Primary Examiner*—Duane S. Smith
*Attorney, Agent, or Firm*—Thomas C. Saitta

[57] ABSTRACT

A vent filter assembly for use with containers containing hazardous chemical or radioactive waste, the assembly having a first stage attached to the container having a first filter media, preferably sintered steel, which allows unaltered passage of pure gas but which blocks passage of particulate matter, and a second stage removably attached to the first stage, the second stage allowing passage of gas but blocking passage of particulate matter and volatile organic solvents. Removal of the second stage from the first stage allows a pure sample of gas to be drawn through the first stage, whereupon the second stage can be reattached to the first stage to provide the required filtering of volatile organic solvents.

12 Claims, 2 Drawing Sheets

MULTI-STAGE VENT FILTER

BACKGROUND OF THE INVENTION

This invention relates generally to the field of devices used to vent gases from containers while retaining other contents within the container, and simultaneously preventing ingress of other undesirable outside substances. More particularly, the invention relates to such devices used with containers containing hazardous materials, such as radioactive waste, where the vent filter must allow passage of hydrogen gas from the containers but prevent radioactive particles from passing through to the atmosphere. Even more particularly, the invention relates to such devices which are multi-stage in construction, with one stage being removable to allow gas samples to be withdrawn through the remaining stage, the removable stage having a filter which absorbs some gases and the remaining stage having a filter which does not absorb any gases.

Safe long-term storage of hazardous waste, and especially of radioactive or mixed chemical/radioactive waste, is a mounting problem. The radioactive materials often produce hydrogen or other gases, meaning that the containers for the waste material must provide for a means to safely vent the gases to prevent explosive build-up within the sealed containers, while at the same time preventing the release of radioactive particulate matter into the atmosphere. In a common situation, the radioactive waste is stored in large metal or polymer drums and a vent filter containing a carbon-composite material is placed into the bung hole or tapped into the wall of the drum. Such filters allow hydrogen gas to pass through while retaining a minimum of 99.93% of the radioactive particulates (to pass Department of Energy regulations), based on a DOP smoke test at 3–5 microns. Other requirements are that the filters allow a minimum flow rate of 35 ml/min based on 1 inch water pressure, with some DOE sites requiring a minimum flow rate of 200 ml/min.

In recent years vent filters substituting a sintered stainless steel media for the carbon composite filter material have been developed. One reason for this change is that it is often necessary or required by the DOE that a sample of the gas in the head space of a drum containing radioactive waste be taken and analyzed prior to shipment of the drum to the final disposal site. Because of the inherent absorption or adsorption properties of the carbon composite filters, the sample cannot be drawn through such a filter without invalidating the sample. The carbon composite must either be removed or destroyed and then replaced, which has the potential of exposing the technicians to the radioactive contents of the drum and creates an additional expense every time a sample is taken. The sintered stainless steel media filters allow passage of hydrogen and other gases, while simultaneously preventing passage of particulate matter. The drum head gas sample can therefore be drawn through the vent filter without invalidating the sample.

The Nuclear Regulatory Commission has approved sintered stainless steel media filters for shipment of radioactive and chemical/radioactive waste to the Waste Isolation Pilot Project in New Mexico. The EPA however is requiring that vent filters for such containers containing chemicals must have the ability to absorb or adsorb and retain certain percentages of volatile organic compounds while still allowing the hydrogen to escape. The sintered stainless steel media filters do not accomplish this, while the carbon composite filters do.

It is an object of this invention to provide a vent filter for a radioactive hazardous waste container which enables a gas sample from the interior of the container to be drawn therethrough without the filter invalidating the sample by absorbing or adsorbing any of the sample, while at the same time preventing passage of radioactive particulates and other matter, and which likewise is able to absorb or adsorb certain volatile organic compounds such as those given off by common solvents. It is a further object to provide such a vent filter which allows single or repeated sampling of the internal gases without destruction of the vent filter. It is a further object to provide such a vent filter which can be, in differing embodiments, secured to an existing threaded bung hole, tapped into a circular aperture or be self-tapping, where the vent filter creates its own aperture. These and other objects not expressed are accomplished by providing a multiple stage vent filter as set forth in detail below, where the vent filter has a first stage adapted to be connected to the waste container and which contains a filter media which allows passage of gases without absorption or adsorption but prevents passage therethrough of particulates, and a removable second stage connected to the first stage, the second stage having an absorbent or adsorbent filter media contained therein which likewise allows passage of gases while preventing passage of particulates, volatile organic compounds and water. To sample the gases within the barrel, the second stage is removed from the first stage, the sample is drawn through the first stage, and the second stage is replaced onto the first stage.

SUMMARY OF THE INVENTION

The invention is a vent filter for use with containers which need to allow gases to vent from the interior of the container, but which contain hazardous chemical or radioactive material whose particulates must be retained within the container and not allowed to vent to atmosphere. In particular, the vent filter is designed for use with metal, polymer, ceramic or combination material drums, barrels, boxes, bottles or other containers used for the transport and storage of such materials, where it is necessary or desirable to allow samples of the internal gases to be obtained through the vent filter, and which also may contain volatile organic solvents.

The vent filter is an assembly comprising two stages. The first stage is constructed to be connected directly to the hazardous or radioactive waste container, and contains a vent passage which allows gasses formed within the container, such as hydrogen gas or the like, to vent to the outside to relieve pressure and prevent catastrophic failure of the container. The first stage is intended to remain connected to the container during the sampling process. The internal gas passes through a first filter media which allows passage of the gas without reacting therewith or adsorbing any of the gas, while simultaneously preventing passage of other matter such as radioactive particles. A second stage is connected to and is easily removable from and reattachable to the first stage, and also contains a vent passage and a filter media. This second filter media likewise allows passage of gases. The second filter also has the ability to adsorb volatile organic compounds which are given off by various solvents which may be present within the container. The first stage does not prevent passage of volatile organic solvents. The second stage is removed to allow a pure gas sample to be drawn through the first stage, then replaced to adsorb any volatile organic compounds which might pass through the first stage.

DETAILED DESCRIPTION OF THE INVENTION

With reference to the drawings, the invention will now be described in detail with regard for the best mode and the preferred embodiment. The invention in general is a venting filter or venting filter plug for use with containers, such as for example drums, barrels, boxes or bottles, containing hazardous or radioactive material which produce hydrogen or other gas during storage, where the gas needs to be vented to prevent a catastrophic pressure build-up within the container. More particularly, the invention is for use in circumstances where a representative pure sample of the internal gas within the container is required to be drawn without removal or destruction of the venting filter, and where the filter is required also to block any volatile organic solvents contained within the container.

Figure 1:
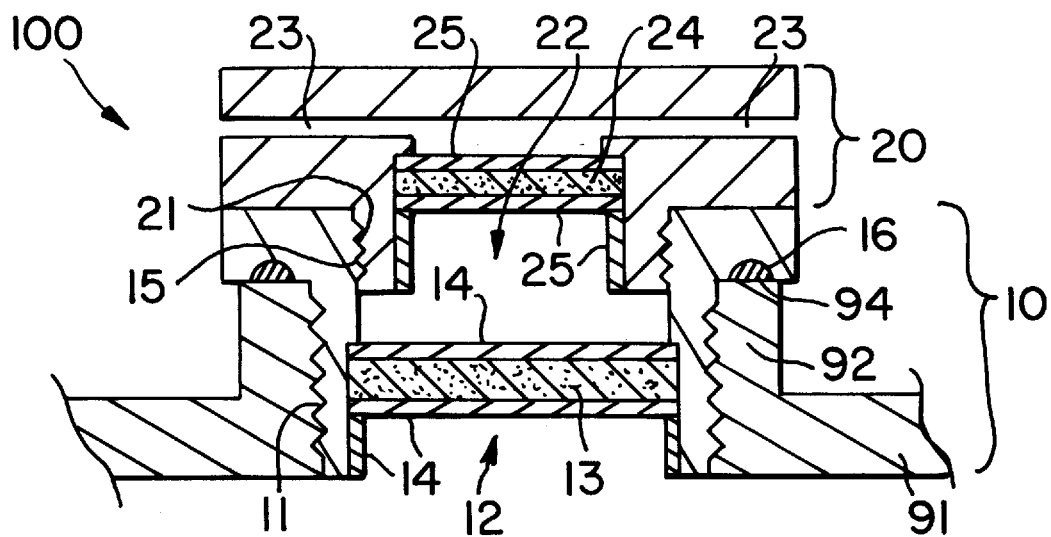
FIG. 1 is a cross-sectional view of the vent filter assembly having external threads for connecting the assembly to an internally threaded bung hole on a container.

With reference now to FIG. 1, the embodiment of the vent filter assembly 100 for use with a standard drum or barrel container 91 having an internally threaded bung hole 92 is illustrated. The vent filter assembly 100 comprises a first stage 10 and a second stage 20. The first stage 10 is connected directly to the container 91, such as by external threading 11 which mates with the internal threading of the bung hole 92, and can be permanently affixed if desired by suitable means, such as adhesive, welding, etc. The first stage 10 comprises connection means 11 to connect the first stage 10 to the container 91, an internal vent passage 12, a first filter media 13, filter media retention means 14 and connection means 15 to connect the first stage 10 to the second stage 20.

The container connection means 11 may comprise any suitable mechanical construct which enables the first stage 10 to be securely attached to the container 91. As shown in FIG. 1, with an internally threaded bung hole 92 such as commonly found in the top wall of a drum or barrel, the container connection means 11 is an externally threaded annular member sized to mate with the bung hole 92. The vent passage 12 extends through the first stage 11. A first filter media 13 is disposed within or at either end of the vent passage 12, such that gas flow through the vent filter 12 must pass through the first filter 13. The first filter media 13 is of the class which allows passage of gas therethrough, and in particular hydrogen gas or the like, without absorbing, adsorbing or altering the chemical characteristics of the gas. The first filter media 13 must also prevent passage of particulate matter, radioactive matter, or other undesirable substances. The preferred material composition of first filter 13 is sintered stainless steel. The first filter media 13 is retained within the first stage by filter retention means 14, which may comprise a multi-apertured plate or screen member. The combination may be held in place by providing a recess in the first stage 10 to receive the first filter 13 and filter retention means 14, or an annular insert may be provided as an additional component of the filter retention means 14. The first stage 10 may further comprise gasket receiving means 16, such as an annular channel or groove, such that a gasket 94 may be utilized to improve the seal between the first stage 10 and the container 91.

The second stage 20 is removably attachable to the first stage 10, such that the second stage 20 may be easily detached from the first stage 10 without harming or destroying either member, and such that the second stage 20 may be reattached after removal, preferably through multiple removal and attachment cycles. The second stage 20 has connection means 21 to connect it to the connection means 15 of the first stage 10. The connection means 21 and connection means 15 may comprise any suitable combination of mechanical configurations or constructs which allows the two stages 10 and 20 to be connected and disconnected, including but not limited to threads, friction fits, keyed interlocks, resilient snap fits, etc. As shown in FIG. 1, connection means 15 comprises an internally threaded portion of the vent passage 12 and connection means 21 comprises a correspondingly sized externally threaded portion of the second stage 20. The second stage 20 further comprises a vent passage 22 which is aligned to communicate with the first stage vent passage 12, such that gas passing through the first stage vent passage 12 enters the second stage vent passage 22. The second stage vent passage 22 provides a conduit to the atmosphere, preferably through one or more lateral channels 23, which enables the major exposed surface of second stage 20 to present a solid surface. Disposed within the vent passage 22 is a second filter media 24, which is likewise held in place by filter retention means 25, which may comprise a combination of screens, insert rings, apertured plates, pads, etc. which allow passage of gas. The second filter media 24 is of a different composition than the first filter media 13, and comprises a substance which allows passage of gas, and in particular hydrogen gas, but which entraps, by adsorption or absorption, some particulate matter and other desirable substances, and which most particularly prevents passage of all of most volatile organic solvents. The preferred composition for the second filter media 24 is activated carbon or another form of carbon or carbon composite material.

With the vent filter assembly 100 in place on a container 91 containing radioactive waste and/or volatile organic solvents, and with the first stage 10 and second stage 20 joined, any hydrogen or other gas produced within the container 91 can vent to atmosphere to relieve internal pressure by passing through both the first filter media 13 and the second filter media 24. Both filter media 13 and 24 prevent particulate matter, including particulate radioactive matter, from passing in either direction. The first filter media 13 allows passage of volatile organic solvents while the second filter media 24 prevents volatile organic solvents from passing out of the container 91. To draw a sample of the internal gas from the container 91, the second stage 20 is removed from the first stage 10, the gas passing through the first filter media 13 is sampled, and the second stage 20 is reconnected to the first stage 10. This operation can be repeated any number of times without needing to replace any component of the vent filter assembly 100.

Figure 2:
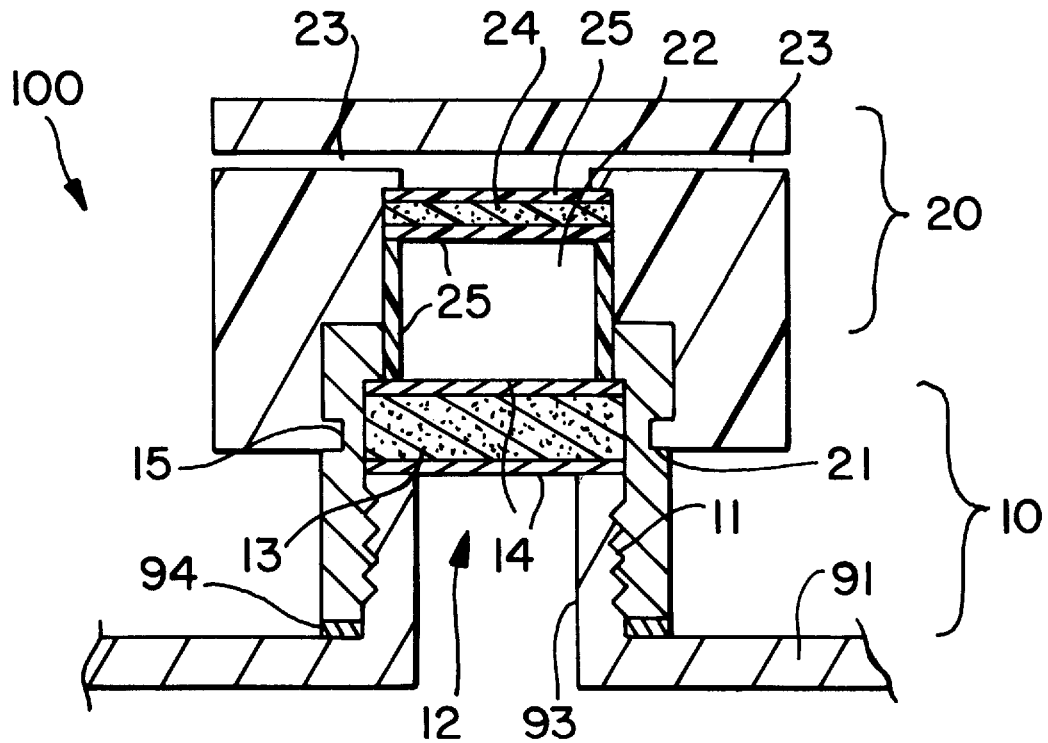
FIG. 2 is a cross-sectional view showing an alternative embodiment of the assembly, where the assembly is internally threaded for connection to a container having an externally threaded neck.

An alternate embodiment for the vent filter assembly 100 is shown in FIG. 2. This embodiment shows the vent filter assembly 100 connected to a container 91 having an externally threaded neck, such as found on a bottle. The container connection means 11 of the first stage 10 comprises internal threading positioned at the base of the vent passage 12. As before the first filter media 13 is disposed across the vent passage 12. An alternative mechanism for connecting the first stage 10 to the second stage 20 is shown, where the second stage 20 is formed from a resilient plastic material.

The first stage connection means 15 comprises an annular channel or groove disposed externally about the first stage 10. The second stage connection means 20 comprises an inwardly facing annular lip or rim which snaps into the annular channel on the first stage 10 to secure the second stage 20.

Figure 3:
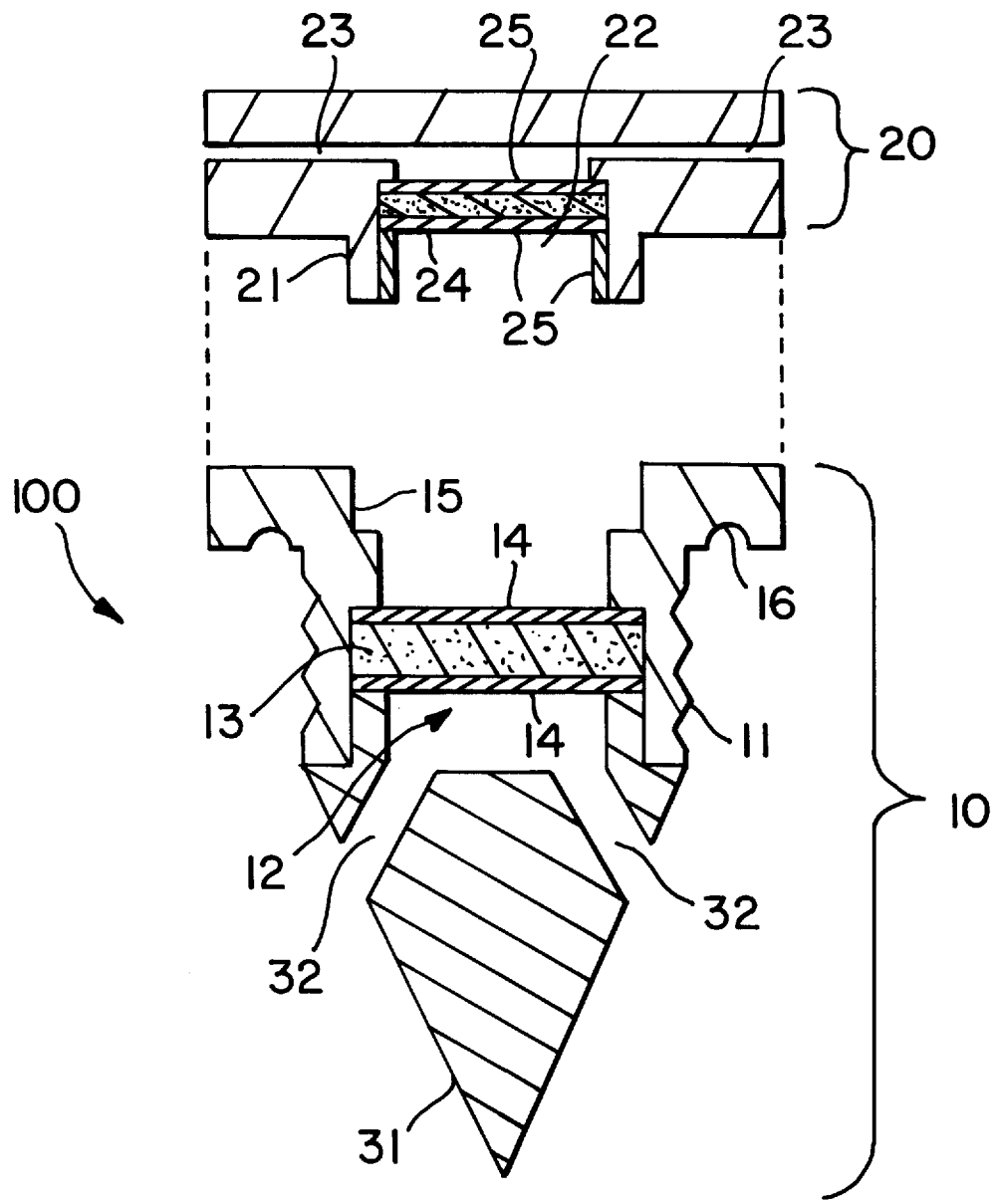
FIG. 3 is a cross-sectional view showing still another alternative embodiment of the assembly, where the assembly has a puncturing means to create an aperture in the wall of a container, and where the first and second stages are shown disconnected.

Still another alternative embodiment is shown in FIG. 3. In this embodiment the first stage 10 further comprises a puncture member 31 attached to the base of the first stage 10. This embodiment of the vent filter assembly 100 is designed for use with containers 91 not having a suitable bung hole 92, neck 93 or like aperture for attachment of the assembly 100. The puncture member 31 is a pointed, hard member formed of a material capable of penetrating the wall of a container 91 when hammered or driven under suitable force. The puncture member 31 contains flow channels 32 which allow passage of gas from the interior of the container 91 through the puncture member 32 and into the vent passage 12 of the first stage 10. The container connection means 11 of first stage 10 comprise externally disposed threads, which allows the first stage 10 to be securely screwed into the hole created by the puncture member 31, with a gasket (not shown) preferably provided in the gasket receiving means 16 to better seal the first stage 10 to the container 91.

An alternative mechanism for connecting the first stage 10 and second stage 20 is shown in this figure, where the connection means 15 of the first stage comprises an annular receiving sleeve and the connection means 21 of the second stage 20 comprises an annular insertion sleeve of smaller diameter, the outer diameter of connection means 21 matching the inner diameter of connection means 15 to form a friction fit which maintains the two stages 10 and 20 in the assembled configuration but allows the second stage 20 to be removed from the first stage 10.

It is understood that equivalents and substitutions for some of the above described elements may be obvious in some instances to those skilled in the art. The true scope and definition of the invention therefore is to be as set forth in the following claims.

We claim:

1. A vent filter assembly for filtering gas vented from a container, the vent filter assembly comprising:

(A) a first stage comprising container connection means to connect said first stage to a container, a first stage vent passage which allows passage of gas from said container through said first stage, a first filter media disposed within said first stage vent passage, and first stage connection means to releasebly connect said first stage to a second stage, where said first filter media prevents passage of particulate matter and does not adsorb, absorb or alter the chemical characteristics of said gas passing therethrough; and (B) a second stage releasably connected to said first stage, said second stage comprising second stage connection means to releasably connect said second stage to said first stage, a second stage vent passage which allows passage of gas from said first stage through said second stage, and a second filter media disposed within said second stage vent passage, where said second filter media prevents passage of particulate matter and removes volatile organic solvents from said gas passing therethrough;

where said second stage is removable from and reattachable to said first stage when said first stage is connected to said container, such that a pure sample of said gas within said container may be drawn through said first stage by removing said second stage from said first stage, said first stage remaining connected to said container, drawing said gas sample through said first stage, and reattaching said second stage to said first stage.

2. The assembly of claim 1, where said first filter media comprises sintered steel.

3. The assembly of claim 2, where said second filter media comprises carbon.

4. The assembly of claim 1, where said second filter media comprises carbon.

5. The assembly of claim 1, where said container connection means comprises externally disposed threads.

6. The assembly of claim 1, where said container connection means comprises internally disposed threads.

7. The assembly of claim 1, where said first stage container connection means further comprises a puncture means to puncture a wall of said container, said puncture means having a flow channel which allows passage of gas from said container into said first stage vent passage.

8. The assembly of claim 1, where said first stage connection means to releasably connect said first stage to said second stage comprises internally disposed threads within said first stage vent passage and where said second stage connection means to releasably connect said second stage to said first stage comprises externally disposed threads.

9. The assembly of claim 1, where said first stage connection means to releasably connect said first stage to said second stage comprises an externally disposed annular channel and where said second stage connection means to releasably connect said second stage to said first stage comprises an inwardly disposed annular lip composed of a resilient material.

10. The assembly of claim 1, where said first stage connection means to releasably connect said first stage to said second stage comprises an annular receiving sleeve and where said second stage connection means to releasably connect said second stage to said first stage comprises an insertion sleeve sized to create a friction fit with said first stage connection means.

11. The assembly of claim 1, further comprising a gasket disposed between said first stage and said container.

12. The assembly of claim 1, where said container connection means permanently connect said first stage to said container.

\* \* \* \* \*